US005762695A

United States Patent [19]
Wong et al.

[11] Patent Number: 5,762,695
[45] Date of Patent: Jun. 9, 1998

[54] FAST DRYING INKS WITH POLYHYDROXY ALCOHOL SURFACTANTS

[75] Inventors: Raymond W. Wong; Marcel P. Breton, both of Mississauga; Guerino G. Sacripante, Oakville; Patricia A. Burns, Milton; Daniel A. Foucher, Toronto, all of Canada

[73] Assignee: Xerox Corporation, Stamford, Conn.

[21] Appl. No.: 786,465

[22] Filed: Jan. 21, 1997

[51] Int. Cl.$^6$ .................................................. C09D 11/02
[52] U.S. Cl. ................................ 106/31.89; 106/31.86; 106/31.9
[58] Field of Search ........................ 106/31.86, 31.89, 106/31.9

[56] References Cited

U.S. PATENT DOCUMENTS

| | | | |
|---|---|---|---|
| 4,840,674 | 6/1989 | Schwarz | 106/31.58 |
| 5,021,802 | 6/1991 | Allred | 346/1.1 |
| 5,041,161 | 8/1991 | Cooke et al. | 106/31.58 |
| 5,043,084 | 8/1991 | Gutierrez et al. | 252/47 |
| 5,065,167 | 11/1991 | You et al. | 346/1.1 |
| 5,141,556 | 8/1992 | Matrick | 106/31.58 |
| 5,372,635 | 12/1994 | Wasilewski et al. | 106/31.86 |
| 5,395,431 | 3/1995 | Siddiqui et al. | 106/31.89 |
| 5,519,085 | 5/1996 | Ma et al. | 106/31.86 |
| 5,534,050 | 7/1996 | Gundlach | 106/31.58 |

*Primary Examiner*—Helene Klemanski
*Attorney, Agent, or Firm*—E. O. Palazzo

[57] ABSTRACT

An imaging process which comprises the development of an image with an aqueous ink jet ink composition comprised of pigment, water, and a polyhydroxy alcohol surfactant present in an amount of from about 2 to about 10 weight percent.

23 Claims, No Drawings

FAST DRYING INKS WITH POLYHYDROXY ALCOHOL SURFACTANTS

BACKGROUND OF THE INVENTION

The present invention is generally directed to aqueous ink compositions. More specifically, the present invention is directed to pigmented aqueous ink compositions particularly suitable for use in ink jet printing processes, and especially thermal ink jet processes, and wherein paper curl is minimized and image smearing is minimal, or avoided. In embodiments, the present invention relates to imaging processes with ink jet inks comprised of water, a sulfonated polyester, pigment, and a polyhydroxy alcohol surfactant, and which surfactant is present in the important amounts of from about 2 to about 10, and preferably from about 2 to about 7 weight percent or parts, and which inks enable a number of advantages, including the minimization or elimination of paper curl when the inks are selected for ink printing processes, such as thermal ink jet processes. Moreover, images developed with the inks of the present invention in embodiments enable ink jet prints of excellent resolution, acceptable density, excellent waterfastness, minimum or very low showthrough, and excellent MFLEN.

Ink jet printing can be considered a non-impact method that produces droplets of ink that are deposited on a substrate, such as paper or transparent film, in response to an electronic digital signal. Thermal or bubble jet drop-on-demand ink jet printers are useful as outputs for personal computers in the office and the home.

In existing thermal ink jet printing, the printhead typically comprises one or more ink jet ejectors, as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is a very temporary phenomenon, and the ink is quickly propelled toward a print sheet. As the bubble begins to collapse, the ink still in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes thereof are illustrated, for example, in U.S. Pat. Nos. 4,840,674; 5,021,802; 5,041,161; 4,853,036; 5,124,718; 5,065,167 and 5,043,084.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important requirement for ink jet ink is the ability of the ink to be stable with minimal or no settling, the ability of the ink to remain in a fluid condition in a printhead opening on exposure to air, and moreover wherein when the inks are selected for ink jet printing there is minimized paper curl, or wherein paper curl can be controlled.

Another important measured property for an ink jet ink is the latency or decap time, which is the length of time over which an ink remains fluid in a printhead opening or nozzle when exposed to air and, therefore, capable of firing a drop of ink at its intended target. Latency is the maximum idling times allowed for ink to be jetted by a printer with a speed equal to or greater than 5 m/s (equivalent to an ink traveling a distance of 0.5 millimeters in less than 100 µs) without a failure. This test was accomplished with the printhead or nozzles uncovered or decapped and generally at a relative humidity of about 15 percent. The time interval is the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, an important requirement for ink jet inks, especially for pigment, such as carbon black, based inks, is for the pigment dispersion to remain stable throughout the life of the ink jet cartridge. Dye-based ink jet inks suffer from deficiencies in waterfastness and lightfastness after being printed on various substrates. Pigments provide an image on a wide variety of substrates, having high optical density with high waterfastness and lightfastness. Therefore, pigments are a preferred alternative to dyes, provided the pigment dispersions can be made stable to prevent flocculation and/or aggregation and settling. Some cosolvents that can be selected as clogging inhibitors cause destabilization of pigment dispersions and, therefore, are not usually effective in pigmented inks.

There is thus a need for aqueous ink compositions that can be utilized in high resolution ink jet printers. Additionally, there is a need for pigmented inks that provide high latency and also remain stable throughout the life of the ink jet cartridge. There is also a need for pigmented inks that provide high optical density in a single application or pass. More importantly, there is a need for ink jet inks wherein paper curl, and/or image smearing can be eliminated or minimized when such inks are selected for ink jet printing processes.

SUMMARY OF THE INVENTION

The present invention relates to an aqueous ink jet ink composition comprised of water, pigment particles, which particles in embodiments having a particle size distribution where at least 70 percent of the particles have a diameter below about 0.1 micron with the remaining particles in the dispersion having a diameter less than or equal to about 1 micron, and certain surfactants that reduce or minimize paper curl. More specifically, the inks of the present are comprised of a major amount of water, pigment particles, especially carbon black, sulfonated polyester pigment stabilizer, and polyhydroxy alcohol surfactants. Also, the present invention relates to a high resolution printing process comprising applying the invention ink composition in imagewise fashion to a substrate. The inks in embodiments possesses a latency of at least 10 seconds in a printer having at least one nozzle of a channel width or diameter ranging from 10 to about 40 microns, and wherein the paper curl is minimized or eliminated.

Important embodiments of the present invention include an imaging process which comprises the development of an image with an aqueous ink jet ink composition comprised of pigment, water, and a polyhydroxy alcohol surfactant present in an amount of from about 2 to about 10 weight percent; an imaging process which comprises the development of an image with aqueous ink jet ink composition comprised of pigment, water, and a polyhydroxy alcohol surfactant present in an amount of from about 2 to about 7 weight percent, and wherein images with minimal curling and minimal smearing are obtained; a high resolution printing process comprising applying in imagewise fashion to a substrate in a printer having at least one nozzle of a channel width or diameter ranging from about 10 to about 40 microns an aqueous ink jet ink composition comprised of pigment, water, and a polyhydroxy alcohol surfactant present in an amount of from about 2 to about 7 weight percent; a process for reducing or eliminating paper curl in an ink jet apparatus which comprises generating images in the apparatus and developing the images with an aqueous ink jet ink composition comprised of pigment, water, and a polyhydroxy alcohol surfactant present in an amount of from about 2 to about 7 weight percent; a process wherein the surfactant HLB, or hydrophilic lipophilic balance is from about 15 to about 20; a process wherein the surfactant HLB, or hydrophilic lipophilic balance is from about 15 to about 19; a process wherein the ink surfactant HLB, or hydrophilic lipophilic balance is from about 15 to about 18 and the surfactant contains less than about 100 polyethylene oxide segments; a process wherein the surfactant HLB, or hydrophilic lipophilic balance is from 15 to 18, and the surfactant contains from about 20 to about 80 polyethylene oxide segments; and a process wherein the surfactant HLB, or hydrophilic lipophilic balance is from 15 to 18, and the surfactant contains about 30 to about 60 polyethylene oxide segments.

Imaging processes of the present invention in embodiments thereof can possess numerous advantages including excellent ink waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly, wherein the inks when selected for ink jet processes enable the minimization of paper curl.

The liquid vehicle of the inks selected for the process of the present invention include water, or may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. In the inks selected for the process of the present invention, the liquid vehicle is generally present in an amount of from about 50 to about 99.5 percent by weight, preferably about 55 to about 95 percent by weight, and more preferably from about 60 to about 90 percent by weight, although the amount can be outside these ranges.

When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The nonwater component of the liquid vehicle generally serves as a humectant which has a boiling point higher than that of water (100° C.). The pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediols, 1,6 hexanediols, diols and triols containing 2 to 10 carbons, sulfoxides, for example dimethylsulfoxide, alkylphenyl sulfoxides or sulfones like sulfolane, dialkyl sulfones, alkyl phenyl sulfones, and the like, amides, for example N,N-dialkyl amides, N,N-alkyl phenyl amides, 3-methyl-2-oxazolidinone, isosorbide dimethyl ether, N-methylpyrrolidinone, N-cyclohexylpyrrolidinone, N,N-diethyltoluamide, and the like, ethers such as alkyl ether derivatives of alcohol, etherdiols, and ethertriols including butylcarbitol, alkyl polyethyleneglycols, and the like, urea, betaine, or the thio (sulfur) derivatives of the aforementioned materials, for example, thioethyleneglycol, trithioethyleneglycol, and the like. Known desired penetrants, water soluble polymers, pH buffer, biocides, chelating agents (EDTA and the like), and optional additives can also be used.

Examples of surfactants include the polyhydroxy alcohol surfactants illustrated herein, such as PEG 1540 monolaurate, PEG 1000 monoricinoleate, PEG 75 lanolin alcohol ether, PEG 6000 monooleate, PEG 200 castor oil (also available under the name MAPEG CO-200, PPG/ Specialty Chem.), and more specifically, Surfynol 485, a PEG-30 tetramethyl decynediol available from Air Products and Chem., and Solan E, a polyethylene glycol (75) lanolin available from Croda, Parsippany, and which surfactants are present in the important amounts indicated herein, such as from about 2 to about 7 weight percent or parts based on the total ink components. The PEG 1540 monolaurate has a HLB value of about 17; the PEG 1000 monoricinoleate, a value of 17.5; the PEG 75 lanolin alcohol ether, a value of about 16; the PEG 6000 monooleate, a value of 19; the PEG 200 castor oil, a value of 18.1; the Surfynol 485, a value of 17; and the Solan E, a value of 15. Other similar commercial surfactants may also be suitable, such as, for example, Atlas G-1288 (ICI Surf. Belgium), a PEG triglyceride with an HLB value of 16.0; Atlas G-1295 (ICI Surf. Belgium), a PEG triglyceride with an HLB value of 17.5; Atlas G-1649 (ICI Am.), a PEG alkyl aryl ether with an HLB value of 16.0; Atlas G-2151 (ICI Am.), a PEG-30 stearate with an HLB value of 16.0; Atlas G-2162 (ICI Am.), a PEG-25 propylene glycol stearate with an HLB value of 16.0; Atlas G-3780A (ICI Am.), a PEG-20 tallow amine with an HLB value of 15.5; Renex 720 (ICI Am.), a PEG-20 syn. primary C13-15 alcohol with an HLB value of 16.2; Mapeg 1000 MS (PPG/Specialty Chem.), a PEG-20 stearate with HLB value of 15.7; Nissan Nonion DS-60HN (Nippon Oils & Fats), a PEG distearate of HLB value of 19.0; Nissan Nonion E-230, a PEG oleyl ether with an HLB value of 16.6; Nissan Nonion HS-220 (Nippon Oils & Fats), a PEG octylphenyl ether with an HLB value of 16.2; Nissan Nonion HS-240 (Nippon Oils & Fats), a PEG-40 octylphenyl ether with an HLB value of 17.9; or Nissan Nonion HS-270 (Nippon Oils & Fats), a PEG-70 octylphenyl ether with an HLB value of 18.7.

The colorant for the ink compositions of the present invention includes a pigment, or a mixture of one or more pigments. The pigment can be black, cyan, magenta, yellow, red, blue, green, brown, mixtures thereof, and the like, and is preferably the carbon black Levanyl carbon black obtained from Bayer. Examples of suitable black pigments include various carbon blacks such as channel black, furnace black, lamp black, and the like. Colored pigments include red, green, blue, brown, magenta, cyan, yellow, and mixtures thereof. Illustrative examples of magenta pigments include 2,9-dimethyl-substituted quinacridone and anthraquinone, identified in the Color Index as Cl 60710, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot CSC-440L and Levanyl Black A-SF. Of these, Levanyl Black A-SF and Cabot CSX-440L are the most preferred. Examples of suitable pigments that may be selected in embodiments are illustrated in U.S. Pat. No. 5,556,727, the disclosure of which is totally incorporated herein by reference.

Preferably, the pigment particle size is as small as possible to enable a stable colloidal suspension of the particles in the liquid vehicle and to prevent clogging of the ink channels when the ink is used in a thermal ink jet printer. Preferred pigment particle average diameters are generally from about 0.001 to about 2 microns, and more preferably from about 0.01 to about 1 micron in volume average diameter, although the particle size can be outside these ranges. A more preferred pigment particle size includes particles having at least 70 percent of the particles being below 0.1 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than about 1.0 micron.

The pigment is present in the ink composition in various effective amounts and generally from about 1 to about 20 percent by weight, preferably from about 3 to about 10 percent by weight, more preferably from about 4 to about 9 percent by weight, and most preferably from about 4 to about 8 percent, although the amount can be outside of these ranges.

Polymeric additives can also be added to the inks to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DIS-COLE® series available from DKS International, Tokyo, Japan, the JEFFAMINE® series available from Texaco, Bellaire, Tex., and the like. Polymeric additives may be present in the ink of the present invention in amounts of from 0 to about 10 percent by weight, preferably from about 0.001 to about 8 percent by weight, and more preferably from about 0.01 to about 5 percent by weight, although the amount can be outside these ranges. A preferred polymeric additive is described in copending application U.S. Ser. No. 536,236, the disclosure of which are totally incorporated herein by reference, which additives are especially useful as pigment like carbon black stabilizers. The self-emulsifying sulfolated polyesters disclosed in U.S. Ser. No. 536,236 can be selected in various appropriate amounts and preferably in amounts of from about 0.1 weight percent to about 12 weight percent and more preferably from about 1 weight percent to about 8 weight percent. The preferred polyesters have a glass transition temperature ranging from about 0° to about 80° C. and preferably between about 20° C. and about 65° C. One selected polyester is a sulfonated polyester with about 7.5 percent sulfonation, weight average molecular weight of about 2,080, $M_n$ of about 1,043, Tg of about 54.9° C., and softening point of about 135° C.

Examples of specific optional ink additives that may be selected include biocides, such as DOWICIL® 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges, penetration control additives, such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 1 to about 30 percent by weight, although the amount can be outside these ranges, pH controlling agents, such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges, or the like.

Other examples of suitable ink additives include those illustrated in U.S. Pat. No. 5,223,026 and U.S. Pat. No. 5,207,825, the disclosures of each of which are totally incorporated herein by reference.

The inks can be prepared by simply mixing the ink components and optional additives when selected. The mixing can be accomplished by various methods including homogenizing, sonification, microfluidization, mechanical mixing, magnetic stirring, high speed jetting, and the like. The sonification process is preferred since such a process provides a homogeneous dispersion by evenly distributing the dispersant throughout the pigment dispersion.

The dispersed pigment can be used as an ink as is, and preferably the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging should be conducted for a time sufficient to remove large size particles and at a rate of about 4,000 to 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, and other suitable polymeric materials; membranes; porous ceramic media; cloth; and the like. The filter should be of a size to remove particles greater than 3 μm in size diameter, preferably greater than 1.2 μm in size, and most preferably greater than 1 μm, for example from about 1 to about 3 microns in size. Any suitable filtration method, such as continuous and/or batch filtration methods, may be used. Continuous filtration methods are preferred for large scale production of pigment inks. Inks which have been centrifuged and filtered so as to preferably remove particles greater than 1 μm in size from the ink are suitable for use as ink jet inks because of their ability to not clog the ink jet, and their long latency and jetting stability.

The surface tension of the pigment dispersions are, for example, greater than about 30 dynes/cm$^2$, preferably greater than about 45 dynes/cm$^2$, and more preferably greater than about 60 dynes/cm$^2$. Ink compositions according to the present invention possess surface tensions greater than about 25 dynes/cm$^2$, preferably greater than about 45 dynes/cm$^2$ and more preferably greater than about 50, such as from about 50 to about 100, dynes/cm$^2$. The viscosity of the ink composition is less than about 10.0 cps, preferably less than about 8.0 cps, and more preferably less than about 5.0 cps, such as from about 1 to about 5 cps. The surface tension can be measured with a Kruss Model K10 tensiometer, and the viscosity can be determined at about 25° C.

The inks of the present invention possess excellent latency. Generally, the inks possess a functional latency of at least 10 seconds, more generally on the order of 20 seconds to greater than 1,000 seconds, with a minimum latency of at least about 30 seconds being preferred.

The ink may be applied to a suitable substrate in image-wise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like. Preferably the paper is indicated in the Examples that follow.

In the Examples that follow the carbon black selected for the inks was Levanyl carbon black obtained from Bayer.

EXAMPLE I

The inks formulations disclosed in Table 1 were prepared by a multi-step process as follows:
Step 1—Preparation of Self-emulsifying Sulfonated Polyester:

A self-emulsifying sulfonated polyester was prepared by a polycondensation process. The polycondensation reactions were accomplished in a modified 5 gallon 4555 Parr Pressure reactor equipped with ½ Hp (1750 rpm) variable speed stirrer motor, a Watlow Series 945 temperature/stirrer controller and a 3 zone ceramic heater unit. A 24 inch Liebeg glass condenser with a 1 liter round bottom catch flask was fitted to a 24.29 steel joint welded to the top plate of the reactor. Glass transitions (Tg) of approximately 10 to 30 milligrams of the polymer were measured on an E.I. DuPont DSC 10 Differential Scanning Calorimeter and the DSC thermograms processed using software supplied with DuPont Thermal Analyst 2200 computer. Softening points (Ts) were measured using a FP83 Dropping Point heater and processed using a Mettler PP80 processor.

The reactor was charged with 3.492 kilos (17.64 moles, Hoechst Celanese) of the above prepared polyester and 0.9405 kilos of dimethyl 5-sulfoisophthalate (3.175 moles, DuPont), 2.901 kilos of propylene glycol (38.12 moles, APCO Industries Company Ltd.), 0.449 kilos of diethylene glycol (4.23 moles, APCO Industries Company Ltd.) and 7.2 grams of the transesterification catalyst, Fascat (Elf Atochem). The initial set temperature of the reactor was 90° C., the temperature was increased slowly to 150° C. over a period of 3 hours. Slow stirring (speed 0.43) of the melt was initiated and the reaction temperature increased to 200° C. over a 4 hour period to allow for transesterification. Methanol distillate was first observed at 157° C., and continued until approximately 1,500 milliliters were recovered. An additional 560 milliliters of excess glycols were removed and trapped in a dry ice trap by increasing the temperature slowly to 210° C. and submitting the mixture to a vacuum of about 260 millimeters/Hg. An Edwards Vacuum pump was then attached and the vacuum slowly decreased to 1 millimeter/Hg to remove an additional 337 milliliters of glycols. Vacuum and heat were continued for an additional two hours at the same temperature and a final hour at 215° C. The reactor was then discharged. The self-emulsifying polymer produced was found to have a glass transition temperature of 54.9° C. and a softening point of 135.1° C. This product containing a sulfonated polyester with 7.5 percent sulfonation, an $M_w$ of 2,080, a Tg of 54.9° C., and a softening point of 135.1° C. was used to prepare stable dispersions of Levanyl (available from Bayer) carbon black.
Step 2—Preparation of Aqueous Solution from Polymer Obtained in Step 1:

An aqueous polyester solution was prepared by slowly adding 10.15 grams of the sulfonated polyester polymer obtained in Step 1 to 118.6 grams of deionized water kept at a temperature of about 80° C. The polymer solution was heated and stirred with a stirring bar at this temperature until the polymer was completely dissolved and the solution appears clear, and for an additional 10 minutes thereafter. The solution is then left to cool down to room temperature, about 25° C., while continuing the agitation.
Step 3—Preparation of Carbon Black Dispersion from Solution Obtained in Step 2:

A carbon black dispersion was prepared by adding 91.23 grams of Levanyl A-SF dispersion available from Bayer (carbon black content of 31.8 percent) to the solution obtained from Step 2. Additional deionized water was added to the mixture to obtain 210 grams of Levanyl/polyester dispersion. The dispersion was then mixed further for a period of 15 minutes.
Step 4—Microfluidization of Dispersion Solutions Prepared in Step 3:

A modified microfluidizer, model M110F, specially modified with compressed air cooling through an isolator and cooling bath externally mounted around the intensifier pump, was used to further process the carbon black dispersion obtained in Step 3. The dispersion obtained in Step 3 was processed at 11,500 psi. The processing temperature, 80° C., was reached within 5 to 10 minutes with the assistance of an electrical heater attached to the inlet vessel of the microfluidizer. The microfluidizer was operated for an additional 15 minutes while maintaining the temperature of the intensifier cooling bath at a temperature of about minus 10° C. This was achieved by circulating compressed air (30 psi) through the isolator cooling line and by maintaining the externally mounted cooling bath filled with dry ice and isopropyl alcohol. The microfluidizer was then shut off and the resulting carbon black dispersion was discharged from the microfluidizer vessel.

Step 5—Preparation of Carbon Black Inks:

The carbon black inks of Table 1 (RW-30A to RW-31 C and RW-39C) were prepared in amounts of 30 grams by adding the required proportions of the microfluidized dispersion obtained in Step 4, for example 13.75 grams for a 6 percent by weight carbon black in the ink, to water, 7.13 grams or less depending on the amount of surfactant in the ink. After five minutes of agitation, 9.00 grams of the sulfolane were added to the mixture. After another five minutes of agitation, 0.125 gram of cyclohexylpyrrolidinone was added and finally, five minutes later, the selected surfactant was added in the amount required to obtain the surfactant concentrations indicated in Table 1. The resulting inks were stirred for about 3 hours at room temperature, left standing for a period of 18 hours, and then filtered through a one micron glass fiber filter. The resulting inks contained 30 percent by weight of self-emulsifying polyester based on the amount of carbon black (10:3, Table 1)

EXAMPLES 39A and B (Control—No Sulfonated Polyester)

Preparation of Carbon Black Inks Without Dissipatible Polymers:

Examples 39A and 39B of Table 1 were prepared with the Levanyl A-SF carbon black dispersion that was not modified by the addition of the self-emulsifying sulfonated polyester (ratio 10:0, Table 1).

Physical Properties and Print Quality of Inks Disclosed in Table 1:

Physical Properties:

The inks disclosed in Table 1 have physical properties, Tables 3 and 5, suitable for printing processes such as thermal ink jet and piezoelectric ink jet. The viscosity of the ink samples was below 8 centipoises and in most of the inks was below 3.5 centipoises. The Solan E with an HLB value of 15 was the more surface active of the two surfactants. It reduced the ink surface tensions to values as low as 37.5 mN/m. The Surfynol 485 with an HLB value of 17 was less surface active. The addition of Surfynol reduced the surface tension to 40 mN/m when it is used at concentration as high as 6.5 by weight. It was desirable to maintain the surface tension of fast drying inks between a value of about 30 mN/m to about 44 mN/m to minimize wetting of the front face at surface tension less than 30 mN/m. Inks with surface tensions greater than about 44 mN/m, that is above the critical surface tension of most plain papers, may possess unacceptable long dry time on plain papers. Inks with surface tensions less than about 42 mM/m and preferably less than about 40 mN/m were most suitable for applications requiring fast ink penetration into plain paper. The preferred surfactants of the present invention can be used at concentrations high enough, for example 2 to about 10 percent, to control the curl and smear properties of pigmented inks without affecting negatively the jetting properties of the inks by increasing the viscosity above 8 cps or reducing the surface tension below 30 mN/m.

Print Quality:

All the inks were printed on an HP 850C printer by replacing the HP carbon black inks by the inks of the above Examples. Test prints were generated on the Xerox Image Series LX paper, a basic paper (7NT in Table 2) and on the Xerox 4024DP paper, an (18NT, an acidic paper, in Table 2). The smear data were obtained by rubbing under pressure the wire side of the selected paper against the felt side of the same paper. On the felt side was printed a black image (1.25 inch square). The optical density of the smeared image (wire side paper) was obtained from a Macbeth TR927 density meter. Under these testing conditions, the HP 850C black print had a smear OD value of about 0.30 on both papers. The curl data were obtained by printing a full page (¼ inch free around the page) image of the selected ink. The image was allowed to dry two hours at room temperature. It was then conditioned at 50 percent relative humidity and about 23° C. for 3 days. The curl was obtained by measuring the height of the corner of the sheet of paper off a flat surface. All four corners were measured and then averaged. The line edge noise (MFLEN, in micron) was obtained by measuring with an image analyzer the line with error associated with a four pixel line printed on the felt side of the selected paper. The smear, optical density and MFLEN data for the inks prepared with the surfactants of the present invention are given in Table 2.

The data provided in Tables 2, 4 and 6 show the advantages of using the surfactants of the present invention at concentrations greater than about one percent by weight and the advantages of using self-emulsifying sulfonated polyesters in carbon black inks. These advantages are particularly important for the Image Series LX paper, a basic paper. For example, the curl height after 3 days at 50 percent RH was reduced from 1.8 centimeters for an ink containing no surfactants (Sample 11A) to as low as 0.7 centimeter for an ink containing 6.5 percent Surfynol 485. The addition of Solan E at the same concentration reduced the curl to 0.2 centimeter on the same paper. On 4024 DP paper, the Solan E surfactant was a more efficient curl control additive as it was effective both on the Image Series LX and the 4024 DP paper.

With respect to smear control, it was found that both surfactants, when used at concentrations equal or greater than 2 weight percent, reduced smear from values of about 0.8 OD to less than 0.5 OD. The optical density of the prints remained acceptable at values greater than about 1.1. Samples containing no self-emulsifying sulfonated polyesters (39A and 39B) showed two different trends upon addition of more Surfynol 485 surfactants depending on the type of paper selected. On Image Series LX, the smear was reduced from 0.80 to 0.57 with no corresponding decrease in optical density. Upon addition of a sulfonated polyester, Sample 39C, the smear was further reduced to 0.28 with no decrease in optical density. There was a significant advantage to using seven weight percent Levanyl A-SF instead of six percent as the more saturated solutions allowed for the design of fast drying inks with higher optical density. On Xerox 4024 DP, there was no effect on smear associated with the addition of Surfynol 485 or of a sulfonated polyester of the composition disclosed herein.

The data also showed that there was an advantage to using a surfactant such as the Solan E at concentration of 6.5 percent. At this concentration, the edge raggedness value was significantly lower than at a concentration of 2.0 percent, from about 35 microns to about 15 microns (average of both papers).

TABLE 1

SURFYNOL 485/SOLAN E FORMULATIONS

| Ink # | % CB | % Cosolvent | Percent Surfactant | Polyester and CHP |
|---|---|---|---|---|
| RW27494- | | | | |
| 30A | 6 | 30 | 0.1% Surfynol 485 | 10:3, 20% CHP |
| 30B | 6 | 30 | 2% Surfynol 485 | 10:3, 20% CHP |
| 30C | 6 | 30 | 6.5% Surfynol 485 | 10:3, 20% CHP |
| 31A | 6 | 30 | 0.1% Solan E | 10:3, 20% CHP |
| 31B | 6 | 30 | 2% Solan E | 10:3, 20% CHP |
| 31C | 6 | 30 | 6.5% Solan E | 10:3, 20% CHP |
| 39A | 7 | 30 | 0.1% Surfynol 485 | 10:0 |
| 39B | 7 | 30 | 1.0% Surfynol 485 | 10:0 |
| 39C | 7 | 30 | 1.0% Surfynol 485 | 10:3, 20% CHP |

The ink contained the sulfonated polyester of Example I, designated as 10:3, pigment (10) to sulfonated polyester (3) ratio amounts; CHP was cyclohexyl pyrrolidone; the cosolvent was sulfolane; 20 percent CHP was based on the amount of sulfonated polyester selected; and 39A and 39B contain no polyester and 10 weight percent of carbon black pigment (10:0).

TABLE 2

SURFYNOL 485/SOLAN E PRINT QUALITY

| | Optical Density | | MFLEN | | Smear | |
|---|---|---|---|---|---|---|
| Ink # | 7NT | 18NT | 7NT | 18NT | 7NT | 18NT |
| RW27494- | | | | | | |
| 30A | 1.36 | 1.23 | 0.9 | 0.2 | 0.75 | 0.66 |
| 30B | 1.24 | 1.13 | 1.1 | 5.4 | 0.19 | 0.41 |
| 30C | 1.25 | 1.03 | 12.4 | 27.1 | 0.36 | 0.07 |
| 31A | 1.37 | 1.23 | 0.0 | 3.4 | 0.58 | 0.76 |
| 31B | 1.34 | 1.16 | 25.4 | 44.6 | 0.64 | 0.50 |
| 31C | 1.18 | 1.13 | 7.1 | 24.8 | 0.08 | 0.18 |
| 39A | 1.36 | 1.32 | 0.5 | 2.6 | 0.80 | 0.86 |
| 39B | 1.38 | 1.30 | 4.5 | 1.9 | 0.57 | 0.92 |
| 39C | 1.41 | 1.33 | 1.7 | 5.8 | 0.28 | 0.89 |

MFLEN represents mid-frequency line edge noise, and 18 NT is an acidic paper.

TABLE 3

PROPERTIES OF INKS CONTAINING SURFYNOL 485

| Sample #: | Composition: | Viscosity:/ cP | Surface Tension: mN/m |
|---|---|---|---|
| RW27494-30A | 0.1 Percent Surfynol | 2.16 | 47.5 |
| RW27494-30B | 2.0 Percent Surfynol | 2.55 | 43.6 |
| RW27494-30C | 6.5 Percent Surfynol | 3.23 | 40.6 |
| RW27494-11A | 0 Percent Control | 2.29 | 48.5 |

The viscosity was measured with a Brookfield viscometer LV type with UL adapter, 60 RPM; and the surface tension was measured with a Kruss Surface Tension Meter with a Wilhelmy plate.

TABLE 4

EFFECT OF SURFYNOL 485 ON PRINT QUALITY

| | Optical Density | | Smear 7NT | MFLEN 7NT | Curl Height/ cm | |
|---|---|---|---|---|---|---|
| Sample #: | 7NT | 18NT | 18NT | 18NT | 7NT | 18NT |
| RW27494-30A | 1.36 | 1.23 | 0.75 0.66 | 0.9 0.2 | 1.6 | 10 |
| RW27494-30B | 1.24 | 1.13 | 0.19 0.41 | 1.1 5.4 | 1.1 | 10 |
| RW27494-30C | 1.25 | 1.03 | 0.36 0.07 | 12.4 27.1 | 0.7 | 10 |
| RW27494-11A | 1.38 | 1.24 | 0.77 0.79 | 1.3 0.4 | 1.8 | 4.8 |

TABLE 5

PROPERTIES OF INKS CONTAINING SOLAN E

| Sample #: | Composition: | Viscosity:/ cP | Surface Tension: mN/m |
|---|---|---|---|
| RW27494-31A | 0.1 Percent Solan E | 2.31 | 42.5 |
| RW27494-31B | 2.0 Percent Solan E | 3.08 | 37.5 |
| RW27494-31C | 6.5 Percent Solan E | 7.14 | 37.5 |
| RW27494-11A | 0 Percent Control | 2.29 | 48.5 |

TABLE 6

EFFECTS OF SOLAN E ON PRINT QUALITY

| | Optical Density | | Smear 7NT | MFLEN 7NT | Curl Height/ cm | |
|---|---|---|---|---|---|---|
| Sample #: | 7NT | 18NT | 18NT | 18NT | 7NT | 18NT |
| RW27494-31A | 1.37 | 1.23 | 0.58 0.76 | 0.0 3.4 | 0.4 | 4.5 |
| RW27494-31B | 1.34 | 1.16 | 0.64 0.50 | 25.4 44.6 | 0.6 | 3.7 |
| RW27494-31C | 1.18 | 1.13 | 0.08 0.18 | 7.1 24.8 | 0.2 | 0.9 |
| RW27494-11A | 1.38 | 1.24 | 0.77 0.79 | 1.3 0.4 | 1.8 | 4.8 |

The surfactants can be selected based on their HLB values, for example between about 15 to about 17. The surfactants with high molecular weights are considered less suitable since they can increase the viscosity.

Other modifications of the present invention may occur to those of ordinary skill in the art subsequent to a review of the present application, and these modifications, including equivalents thereof, are intended to be included within the scope of the present invention.

What is claimed is:

1. An imaging process consisting essentially of the development of an image with an aqueous ink jet ink composition comprised of pigment, water, a polyhydroxy alcohol surfactant present in an amount of from about 2 to about 10 weight percent, and a sulfonated polyester, and wherein said polyhydroxy alcohol surfactant possesses an hydrophilic lipophilic balance of from about 15 to about 20 and said surfactant contains from about 20 to about 80 polyethylene oxide segments.

2. An imaging process in accordance with claim 1 wherein said polyhydroxy alcohol surfactant is present in an amount of from about 2 to about 7 weight percent, and wherein images with minimal curling and minimal smearing are obtained.

3. A process in accordance with claim 2 wherein the surfactant is polyethylene tetramethyidecyne with 30 ethylene oxide segments.

4. A process in accordance with claim 2 wherein the surfactant is lanolin with 75 segments or units of ethylene oxide attached thereto.

5. A process in accordance with claim 1 wherein the surfactant is selected in an amount of from about 2 to about 7 weight percent, and wherein said sulfonated polyester is a dissipatible or a self emulsifying sulfonated polyester.

6. A process in accordance with claim 2 wherein the surfactant HLB, or hydrophilic lipophilic balance is from 15 to 19.

7. A process in accordance with claim 2 wherein said pigment is present in a concentration ranging from about 4 to about 10 percent by weight of said ink composition.

8. A process in accordance with claim 2 wherein said pigment is carbon black, and wherein said inks possess a latency of at least about 10 seconds.

9. A process in accordance with claim 2 wherein said pigment possesses a particle size distribution wherein at least about 90 percent of said pigment particles have a diameter of about 0.1 µm with the remaining pigment particles being of a diameter of about 1.0 µm.

10. A high resolution printing process comprising applying in imagewise fashion to a substrate in a printer having at least one nozzle of a channel width or diameter ranging from about 10 to about 40 microns an aqueous ink jet ink composition comprised of pigment, water, sulfonated polyester, and a polyhydroxy alcohol surfactant present in an amount of from about 2 to about 7 weight percent and which polyhydroxy alcohol surfactant has a hydrophilic lipophilic balance of from about 15 to about 20 and wherein said surfactant contains from about 20 to about 80 polyethylene oxide segments.

11. A process in accordance with claim 10 wherein the substrate is paper, and paper curl and image smearing is minimized or eliminated, and wherein said printing process is optionally accomplished with a 600 spi ink jet printer.

12. A process for reducing or eliminating paper curl in an ink jet apparatus which comprises generating images in said apparatus and developing said images with an aqueous ink jet ink composition comprised of pigment, water, sulfonated polyester, and a polyhydroxy alcohol surfactant present in an amount of from about 2 to about 10 weight percent and wherein said polyhydroxy alcohol surfactant possesses a hydrophilic lipophilic balance from about 15 to about 20.

13. A process in accordance with claim 12 wherein said surfactant is present in an amount of about 2 to about 7 weight percent.

14. A process in accordance with claim 12 wherein said surfactant HLB, or hydrophilic lipophilic balance is from about 15 to about 19.

15. A process in accordance with claim 2 wherein said surfactant HLB, or hydrophilic lipophilic balance is from 15 to 18, and said surfactant contains less than about 100 polyethylene oxide segments.

16. A process in accordance with claim 2 wherein said surfactant HLB, or hydrophilic lipophilic balance is from 15 to 18, and said surfactant contains from about 20 to about 80 polyethylene oxide segments.

17. A process in accordance with claim 2 wherein said surfactant HLB, or hydrophilic lipophilic balance is from 15 to 18, and said surfactant contains about 30 to about 60 polyethylene oxide segments.

18. A process in accordance with claim 1 wherein said sulfonated polyester contains about 7.5 percent sulfonation, and a weight average molecular weight of about 2,080, a softening point of about 130° C., and a glass transition temperature of about 55° C.

19. A process in accordance with claim 1, wherein said ink jet composition further contains a cosolvent.

20. An imaging process in accordance with claim 19, wherein the hydrophilic lipophilic balance is about 15, and the cosolvent is sulfolane.

21. An imaging process which comprises the development of an image with an aqueous ink jet composition comprised of pigment, water, and a polyhydroxy alcohol surfactant present in an amount from about 2 to about 10 weight percent and wherein said surfactant is lanolin with 75 segments or units of ethylene oxide attached thereto, and wherein images with minimal curling and minimal smearing are obtained.

22. A process in accordance with claim 21, wherein the colorant is a pigment.

23. A process in accordance with claim 21, wherein the ink further contains a sulfonated polyester.

* * * * *